United States Patent
Nomura et al.

(10) Patent No.: US 7,113,376 B2
(45) Date of Patent: Sep. 26, 2006

(54) MOTOR CONTROL APPARATUS

(75) Inventors: Manabu Nomura, Toyota (JP); Satoshi Yoshimura, Kariya (JP)

(73) Assignee: Denso Corporation, Kariya (JP)

( * ) Notice: Subject to any disclaimer, the term of this patent is extended or adjusted under 35 U.S.C. 154(b) by 254 days.

(21) Appl. No.: 10/800,705

(22) Filed: Mar. 16, 2004

(65) Prior Publication Data

US 2004/0184206 A1    Sep. 23, 2004

(30) Foreign Application Priority Data

Mar. 17, 2003    (JP)    ............................ 2003-071829

(51) Int. Cl.
*H02H 5/04*    (2006.01)

(52) U.S. Cl. ........................................ 361/31
(58) Field of Classification Search ................ 361/23, 361/24, 30, 31
See application file for complete search history.

(56) References Cited

U.S. PATENT DOCUMENTS 6,016,965 A * 1/2000 Yoshimura et al. ........... 236/35

FOREIGN PATENT DOCUMENTS

| JP | A-H02-101992 | 4/1990 |
| JP | A-H09-284999 | 10/1997 |
| JP | A-H09-308261 | 11/1997 |
| JP | A-H10-8959 | 1/1998 |
| JP | A-H10-42586 | 2/1998 |

* cited by examiner

*Primary Examiner*—Brian Sircus
*Assistant Examiner*—Lucy Thomas
(74) *Attorney, Agent, or Firm*—Posz Law Group, PLC (57) ABSTRACT

In a control apparatus for a motor, an over-current protection circuit detects an abnormality in a motor current forcibly turns off a MOSFET. The over-current protection circuit has a timer function and a time switching function. In the timer operation, the over-current protection circuit stops an abnormality detection signal for an ON time period before producing the signal for an OFF time period when a current flowing through the motor exceeds a predetermined threshold value. The time switching function is for controlling to lengthen the OFF time period to a relatively larger value in comparison with the ON time period.

2 Claims, 7 Drawing Sheets

MOTOR CONTROL APPARATUS

CROSS REFERENCE TO RELATED APPLICATION

This application is based on and incorporates herein by reference Japanese Patent Application No. 2003-71829 filed on Mar. 17, 2003.

FIELD OF THE INVENTION

The present invention relates to a motor control apparatus for controlling a current of a motor by turning on and off a semiconductor switch device.

BACKGROUND OF THE INVENTION

In order to reduce noises and power consumption in an apparatus for controlling a fan motor used in an engine cooling system in an automobile, for example, a pulse width modulation (PWM) control module is used to execute continuous or proportional control on the rotating speed of the fan motor. When an excessively large current flows due to a rotation lock state of the fan motor or a short circuit, it is quite likely that a semiconductor switch device in the PWM control module is damaged by heat.

As a general solution, an over-current protection circuit capable of coping with such an excessively large current is thus provided. When the semiconductor switch device is put in a state of being turned off continuously as it is after detection of the flow of the excessively large current, however, the fan motor is also put in a stopped rotation state as it is, having an adverse effect on the function to cool the engine. In order to solve these problems, a motor control apparatus having over-current protection functions has been provided.

For instance, a circuit is provided to establish a limited current state of limiting the current flowing through the fan motor to a level, which does not generate excessive heat causing the breakdown of the semiconductor switch device, when an excessively large current flows due to a rotation lock state of the fan motor or another cause while maintaining continuous conduction of the current through the fan motor in the limited current state as is disclosed in documents such as Japanese Patent No. 3,102,355 (patent document 1).

In addition, another circuit is also adopted to intermittently continue the output of the PWM control module when an excessively large current flows. This circuit is adopted to provide a control configuration in which the current flowing through the fan motor is put in a suppressed state when an excessively large current is detected. In this current suppression state, the temperature of the inside of the PWM control module is monitored. When the temperature of the inside of the PWM control module exceeds an upper limit, the output of the PWM control module is once discontinued. As the temperature of the inside of the PWM control module later becomes lower than a level set in advance, the PWM control module is reset to an initial condition. These operations are carried out repeatedly until a normal condition is restored as disclosed in Japanese patent laid open publication No. Hei 9-284,999 (patent document 2).

The control according to the patent document 1 is effective in maintaining the operation of the fan motor and the prevention of the breakdown of the semiconductor switch device. Since the current conduction through the fan motor is continued, however, it is quite likely that a layer short circuit is generated in the fan motor eventually in dependence on the location of the cause of the excessively large current.

In the case of the control according to the patent document 2, on the other hand, an over-current protection operation is carried out by monitoring the current flowing through the fan motor and the temperature of the inside of the PWM control module at the same time. Thus, in particular, a time delay unavoidably occurs in an operation to stop the output of the PWM control module when the temperature of the inside of the PWM control module exceeds the upper limit. When such a time delay occurs, the temperature of the inside of the PWM control module most likely increases sharply due to a layer short circuit generated in the fan motor or another cause. An inability to cope with such a sharp increase in temperature will lower reliability of the operation to protect the motor control apparatus and the motor from damage.

SUMMARY OF THE INVENTION

It is thus an object of the present invention addressing the above problems to provide a motor control apparatus for controlling a motor as an apparatus capable of carrying out an operation to protect the apparatus itself and the motor from damage caused by heat generated by an excessively large current with a high degree of reliability when the excessively large current flows while maintaining the operating state of the motor.

The present invention provides a motor control apparatus for controlling a motor with an over-current protection circuit, wherein a timer operation is carried out repeatedly after the current flowing through the motor at a magnitude exceeding a predetermined threshold value is detected. In the timer operation, after an abnormality detection signal for stopping the operation of a driving circuit is stopped during an ON time period set in advance, the abnormality detection signal is outputted during an OFF time period set in advance. That is, the driving circuit stops driving a semiconductor switch device during the OFF time period but executes driving the semiconductor switch device during the ON time period. Accompanying such operations, the temperature of the semiconductor switch device increases during an executed driving period but decreases during a ceased driving period, eventually getting saturated at a predetermined value.

In addition, during a time period in which the above operations of the timers are carried out, that is, during a time period of an over-current protection operation, control is executed to make the OFF time period relatively longer in comparison with the ON time period by such a difference that, the larger the excessively large current flowing through the motor, the larger the difference. Specifically, as the current flowing through the motor increases, the ratio of the OFF time period to the ON time period is also raised as well. Thus, during the time period in which the over-current protection operation is carried out, the saturation temperature at which the increase of the temperature of the semiconductor switch device gets saturated can be suppressed to a relatively low value even when the current flowing through the motor increases.

As a result, the saturation temperature provided by the over-current protection operation can be suppressed at a level, which is capable of maintaining the performance of the semiconductor switch device, without regard to whether the current flowing through the motor is large or small. Thus, the reliability of the over-current protection operation can be increased. In addition, in the operation of the over-current protection function, the operating state of the motor can be maintained although intermittently. Thus, the present invention is suitable for applications in which the operation of the motor even must be continued even in the over-current protection function being carried out.

BRIEF DESCRIPTION OF THE INVENTION

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to various embodiments, in which a motor control apparatus is applied to an electrically driven fan system used in cooling equipment for an engine of an automobile.

First Embodiment

Figure 1:
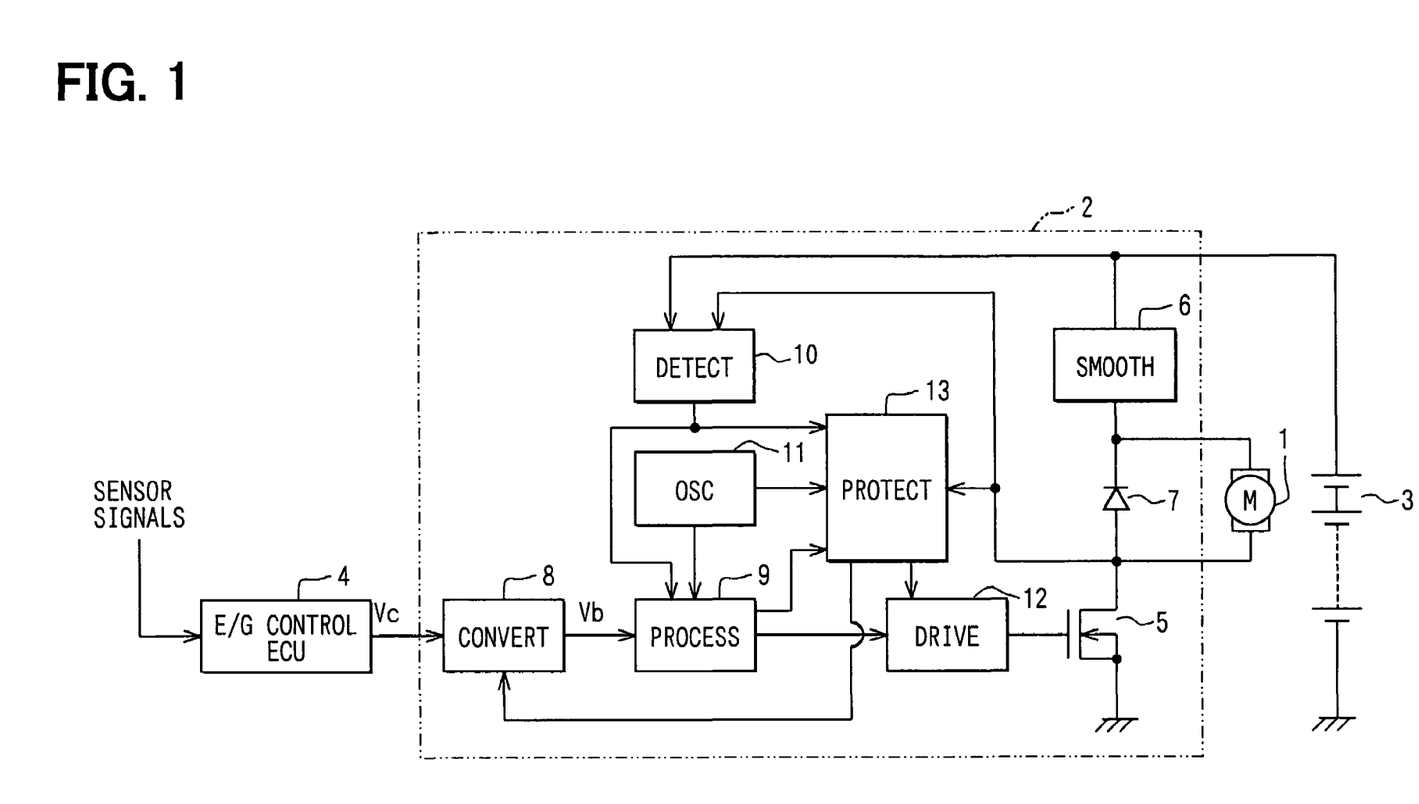
FIG. 1 is a block diagram showing a motor control apparatus according to the first embodiment of the present invention.

Referring to FIG. 1, a direct current motor 1 serves as a driver of a blower fan (not shown) for cooling down engine cooling refrigerant flowing through the inside of a heat exchanger such as a radiator. A motor control apparatus 2 controls the rotating speed of a motor 1. A battery 3 supplies power to the motor control apparatus 2 by way of an ignition switch (not shown). It is to be noted that, in some configurations, the battery 3 supplies power to the motor control apparatus 2 directly.

The voltage applied to the motor 1 determines the rotating speed of the blower fan. The motor control apparatus 2 adjusts the level of the voltage by adoption of a pulse width modulation (PWM) control method of switching application of the output of the battery 3 to the motor 1. The motor control apparatus 2 has a configuration of receiving a voltage command signal Vc from an electronic control unit (ECU) 4 for an engine (E/G) control. The voltage command signal Vc is an output level command signal requesting the level of the voltage to be output to the motor 1. It is to be noted that signals are each exchanged between the engine control ECU 4 and the motor control apparatus 2 through pulse communication. Thus, the voltage command signal Vc is a pulse train signal.

The engine control ECU 4 has a known configuration for carrying out operations to control the engine on the basis of a variety of signals input from sensors as signals required for the operations. In this case, the engine control ECU 4 processes the sensor signals under a condition set in advance to generate the voltage command signal Vc necessary for keeping the engine cooling refrigerant at a target control temperature and, then, supplies the voltage command signal Vc to the motor control apparatus 2. It is to be noted that the sensor signals include signals received from a temperature sensor for detecting the temperature of the engine cooling refrigerant, a car speed sensor and an A/C switch.

The motor control apparatus 2 has an n channel power MOSFET 5 serving as a semiconductor switch device for executing the PWM control. The MOSFET 5 put in an ON state forms a connection of a conduction path from the battery 3 to the motor 1 by way of a smoothing circuit 6. It is to be noted that the smoothing circuit 6 is provided also to serve as a means for suppressing conduction noises generated in operations to switch the MOSFET 5. A flywheel diode 7 is connected between the input terminals of the motor 1 as a means for absorbing a counter electromotive force.

In order to drive the MOSFET 5 and to protect the motor control apparatus 2 and the motor 1 from damage caused by heat generated by an excessively large current flowing through the motor 1, the motor control apparatus 2 is provided with internal circuits including an input signal conversion circuit 8, a signal processing circuit 9, a motor voltage detection circuit 10, an oscillation circuit 11, a driving circuit 12 and an over-current protection circuit 13.

The input signal conversion circuit 8 functions as an input interface for converting the pulse train voltage command signal Vc received from the engine control ECU 4 into a direct current voltage signal Vb and supplying it to the signal processing circuit 9.

The motor voltage detection circuit 10 detects a voltage appearing between the terminals of the motor 1 and supplies a voltage detection signal representing the detected voltage to the signal processing circuit 9 and the over-current protection circuit 13. In the case of driving the motor 1 by the PWM control, the voltage appearing between the terminals of the motor 1 goes up and down sharply in accordance with the ON and OFF states of the MOSFET 5. Instead of detecting such sharp changes in voltage, the configuration of the motor control apparatus 2 includes the smoothing circuit 6 for applying a smoothly varying voltage, which is detected by the motor voltage detection circuit 10, between the terminals of the motor 1.

The oscillation circuit 11 generates a reference clock signal having a predetermined frequency and supplies the signal to the signal processing circuit 9 and the over-current protection circuit 13.

The signal processing circuit 9 has a known configuration used for generating a PWM signal with a pulse train waveform on the basis of a result of comparison of the direct current voltage signal Vb with the voltage detection signal fed back by the motor voltage detection circuit 10 and the reference clock signal generated by the oscillation circuit 11. This configuration is used for supplying the PWM signal to the driving circuit 12 and the over-current protection circuit 13. As described above, the direct current voltage signal Vb is received from the engine control ECU 4 by way of the input signal conversion circuit 8 whereas the voltage detection signal represents the voltage appearing between the input terminals of the motor 1.

The driving circuit 12 amplifies the PWM signal to generate a voltage signal and applies the voltage signal between the gate and source of the MOSFET 5 to switch the MOSFET 5 on and off. In turn, the switched MOSFET 5 carries out a PWM driving operation on the motor 1. As a result of the PWM driving operation on the motor 1, an average voltage of the voltage applied to the motor 1 can be used for controlling the motor 1, which can thus be driven to run at a variable speed.

The over-current protection circuit 13 is a circuit provided for protecting the motor 1 and the motor control apparatus 2 from damage caused by heat generated by an excessively large current flowing through the motor 1 due to a rotation lock state of the motor 1 or a short circuit state of a load wire by detection of such a current.

Figure 2:
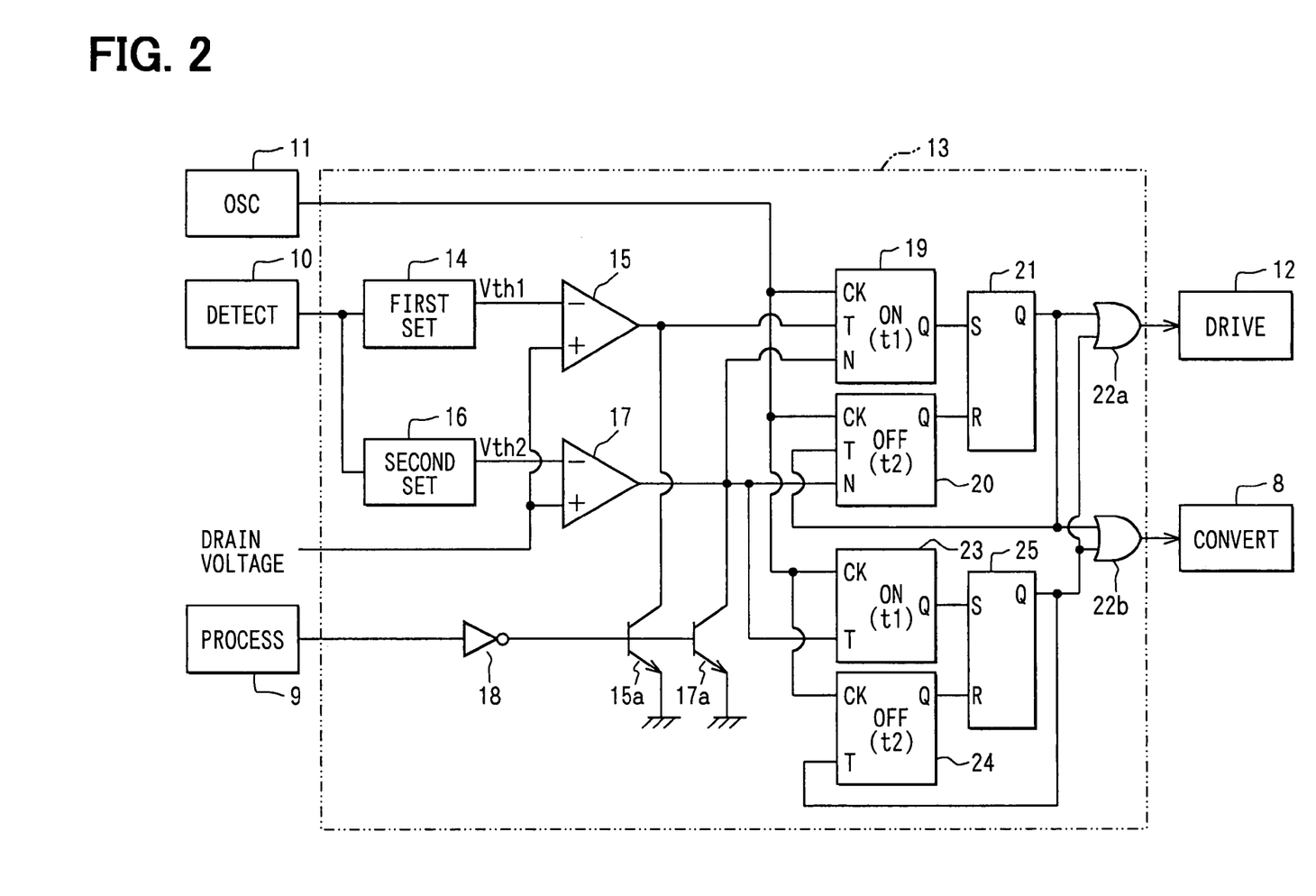
FIG. 2 is a detailed circuit configuration of an over-current protection circuit in the first embodiment.

The over-current protection circuit 13 is shown in FIG. 2. The over-current protection circuit 13 receives a voltage appearing between the drain and source of the MOSFET 5 in addition to the aforementioned input signals, i.e., the PWM signal generated by the signal processing circuit 9, the voltage detection signal generated by the motor voltage detection circuit 10 and the reference clock signal generated by the oscillation circuit 11. The voltage appearing between the drain and source of the MOSFET 5 is referred to hereafter simply as a drain voltage. The over-current protection circuit 13 detects a load current flowing through the motor 1 on the basis of the drain voltage applied to the MOSFET 5 during a time period in which the MOSFET 5 is in an ON state.

A first over-current detection threshold voltage setting circuit 14 receiving the voltage detection signal generated by the motor voltage detection circuit 10 outputs a first threshold voltage vth1, which is set at a relatively small value for a range of higher levels of the voltage detection signal. A first comparator 15 compares the first threshold voltage Vth1 with the drain voltage and produces the output thereof into a signal set at a high level as the drain voltage exceeds the first threshold voltage Vth1.

A second over-current detection threshold voltage setting circuit 16 receiving the voltage detection signal generated by the motor voltage detection circuit 10 outputs a second threshold voltage Vth2, which is set at a relatively small value for a range of higher levels of the voltage detection signal. However, the second threshold voltage Vth2 is set at a level higher than the first threshold voltage Vth1 by a predetermined difference. A second comparator 17 compares the second threshold voltage Vth2 with the drain voltage and produces the output thereof into a signal set at a high level as the drain voltage exceeds the second threshold voltage Vth2.

The output of the first comparator 15 is connected to the ground by an NPN type bipolar transistor 15a. Specifically, the collector of the NPN type bipolar transistor 15a is connected to the output of the first comparator 15, while the emitter of the NPN type bipolar transistor 15a is connected to the ground. The output of the second comparator 17 is connected to the ground by an NPN type bipolar transistor 17a. Specifically, the collector of the NPN type bipolar transistor 17a is connected to the output of the second comparator 17, while the emitter of the NPN type bipolar transistor 17a is connected to the ground.

The bases of the NPN type bipolar transistor 15a and the NPN type bipolar transistor 17a receive a signal output by an inverter circuit 18 as a result of inversion of the PWM signal generated by the signal processing circuit 9. Thus, when the PWM signal is set at a low level, that is, during a time period in which the MOSFET 5 is put in the OFF state, the NPN type bipolar transistor 15a and the NPN type bipolar transistor 17a are turned on and the ON states of the NPN type bipolar transistor 15a and the NPN type bipolar transistor 17a forcibly pull down the outputs of the first comparator 15 and the second comparator 17 respectively to the low level.

During a time period in which the MOSFET 5 is put in the ON state, on the other hand, the output of the first comparator 15 is set in accordance with a result of comparison. To be more specific, when the level of the load current flowing through the MOSFET 5 exceeds a first over-current level corresponding to the first threshold voltage Vth1, the first comparator 15 outputs a signal set at the high level. Similarly, during the time period in which the MOSFET 5 is put in the ON state, the output of the second comparator 17 is set in accordance with a result of comparison. To be more specific, when the level of the load current flowing through the MOSFET 5 exceeds a second over-current level corresponding to the second threshold voltage Vth2, the second comparator 17 outputs a signal set at the high level. The second threshold voltage Vth2 is set at a level higher than the first threshold voltage Vth1.

During a time period in which the MOSFET 5 is put in the OFF state, an increase in drain voltage is ignored in the operations carried out by the first comparator 15 and the second comparator 17, which detect an excessively large current flowing through the MOSFET 5. During the time period in which the MOSFET 5 is put in the ON state, on the other hand, the first comparator 15 outputs a signal set at the high level in dependence on the load current flowing through the MOSFET 5 and exceeding the first over-current level corresponding to the first threshold voltage Vth1. Similarly, during the time period in which the MOSFET 5 is put in the ON state, the second comparator 17 outputs a signal set at the high level in dependence on the load current flowing through the MOSFET 5 and exceeding the second over-current level corresponding to the second threshold voltage Vth2.

The reference clock signal generated by the oscillation circuit 11 is supplied to a clock terminal CK of a first ON-timer 19 and a clock terminal CK of a first OFF-timer 20. The first ON-timer 19 has a configuration to start a first ON-timer operation to count the number of pulses during an ON time period t1 set therein on the rising edge of the signal supplied to a trigger terminal T. As the first ON-timer operation is finished, the first ON-timer 19 outputs a signal set at a high level from an output terminal Q thereof. The counted pulses are a signal produced as a result of dividing the frequency of the reference clock signal.

Similarly, the first OFF-timer 20 has a configuration to start a first OFF-timer operation to count the number of pulses during an OFF time period t2 set therein on the rising edge of a signal supplied to a trigger terminal T. As the first OFF-timer operation is finished, the first OFF-timer 20 outputs a signal set at a high level from an output terminal Q thereof. The counted pulses are a signal produced as a result of dividing the frequency of the reference clock signal.

It is to be noted that the first ON-timer 19 and the first OFF-timer 20 each have a disable terminal N. When a signal set at a high level is supplied to the disable terminal N, the first ON- and OFF-timer operations are inhibited. The disable terminals N of both the first ON-timer 19 and the first OFF-timer 20 are connected to the output terminal of the second comparator 17.

In the first ON-timer 19, the trigger terminal T is connected to the output terminal of the first comparator 15 and the output terminal Q is connected to a set input terminal S of an R-S flip-flop circuit, which is used as a first latch circuit 21. Thus, when the first comparator 15 detects an excessively large current, the first ON-timer 19 starts the first ON-timer operation during the ON time period t1. As the first ON-timer operation is finished, the first latch circuit 21 is set to latch a detected over-current state.

In a steady state condition with the detected over-current state lifted or released from the first latch circuit 21, the first latch circuit 21 outputs a signal set at a low level. With the detected over-current state latched in the first latch circuit 21, however, the first latch circuit 21 outputs a signal set at the high level as an abnormality detection signal. The signal output by the first latch circuit 21 is supplied to the trigger terminal T of the first OFF-timer 20. The signal is also supplied to the driving circuit 12 and the input signal conversion circuit 8 by way of or OR gates 22a and 22b respectively. The output terminal Q of the first OFF-timer 20 is connected to a reset input terminal R of the first latch circuit 21.

Thus, when the first latch circuit 21 is set, outputting the abnormality detection signal, the first OFF-timer 20 starts the first OFF-timer operation during the OFF time period t2. As the first OFF-timer operation is finished, the first latch circuit 21 is reset to lift or release the detected over-current state.

The reference clock signal generated by the oscillation circuit 11 is also supplied to a clock terminal CK of a second ON-timer 23 and a clock terminal CK of a second OFF-timer 24. The second ON-timer 23 has a configuration to start a second timer operation to count the number of pulses during an ON time period t1', which is shorter than the ON time period t1 set in the first ON-timer 19, on the rising edge of the signal supplied to a trigger terminal T. As the second timer operation is finished, the second ON-timer 23 outputs a signal set at a high level from an output terminal Q thereof. The counted pulses are a signal produced as a result of dividing the frequency of the reference clock signal.

Similarly, the second OFF-timer 24 has a configuration to start a second OFF-timer operation to count the number of pulses during an OFF time period t2', which is longer than the OFF time period t2 set in the first OFF-timer 20, on the rising edge of a signal supplied to a trigger terminal T. As the second OFF-timer operation is finished, the second OFF-timer 24 outputs a signal set at a high level from an output terminal Q thereof. The counted pulses area signal produced as a result of dividing the frequency of the reference clock signal.

In the second ON-timer 23, the trigger terminal T is connected to the output terminal of the second comparator 17 and the output terminal Q is connected to a set input terminal S of an R-S flip-flop circuit, which is used as a second latch circuit 25. Thus, when the second comparator 17 detects an excessively large current, the second ON-timer 23 starts the second timer operation during the ON time period t1' (<t1). As the second timer operation is finished, the second latch circuit 25 is set to latch a detected over-current state.

In a steady state condition with the detected over-current state lifted from the second latch circuit 25, the second latch circuit 25 outputs a signal set at a low level. With the detected over-current state latched in the second latch circuit 25, however, the second latch circuit 25 outputs a signal set at a high level as an abnormality detection signal. The signal output by the second latch circuit 25 is supplied to the trigger terminal T of the second OFF-timer 24. The signal is also supplied to the driving circuit 12 and the input signal conversion circuit 8 by way of or the OR gates 22a and 22b respectively. The output terminal Q of the second OFF-timer 24 is connected to a reset input terminal R of the second latch circuit 25.

Thus, when the second latch circuit 25 is set, outputting the abnormality detection signal, the second OFF-timer 24 starts the second OFF-timer operation during the OFF time period t2' (>t2). As the second OFF-timer operation is finished, the second latch circuit 25 is reset to lift the detected over-current state.

The driving circuit 12 has a configuration to forcibly turn off the MOSFET 5 when receiving the abnormality detection current and lift the forcibly set OFF state of the MOSFET 5 as the abnormality detection signal disappears later. As will be described later, the input signal conversion circuit 8 has a configuration including a function to use the abnormality detection signal as a signal used in an operation to suppress a rush or surge current.

Figure 3:
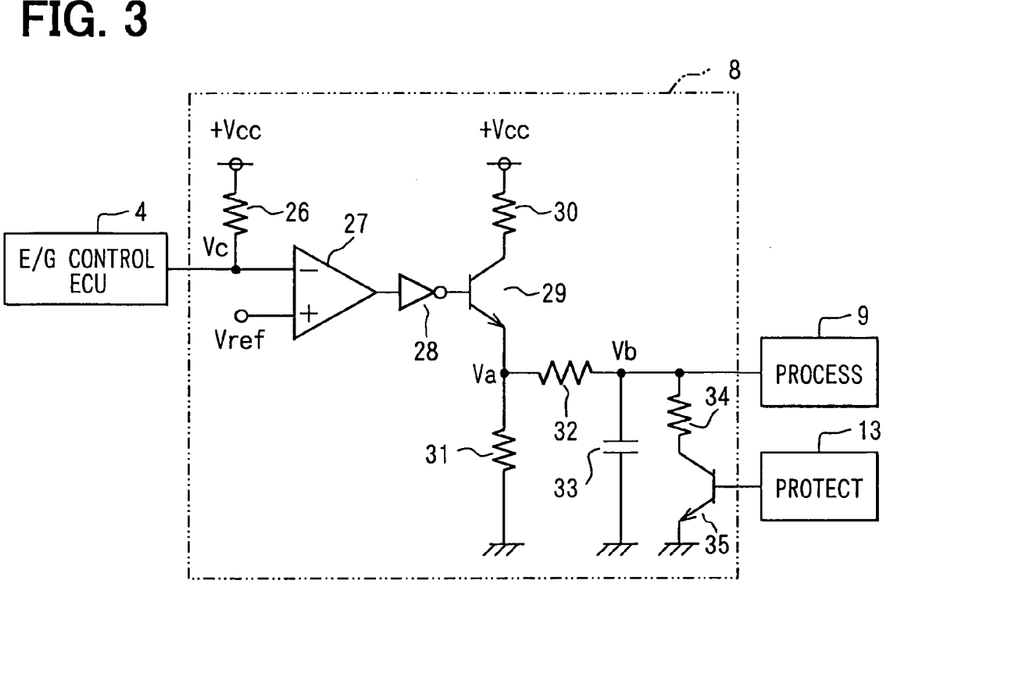
FIG. 3 is a detailed circuit configuration of an input signal conversion circuit in the first embodiment.

In the input signal conversion circuit 8 shown in FIG. 3, a power supply terminal +Vcc is connected to an output terminal of the engine control ECU 4 by a pull-up resistor 26. The output terminal of the engine control ECU 4 is provided in the form of an open collector, which is not shown in the figure. The pulse train voltage command signal Vc generated by the engine control ECU 4 is supplied to an inverting input terminal (−) of a comparator 27. On the other hand, a reference voltage Vref is supplied to a non-inverting input terminal (+) of the comparator 27. The comparator 27 has a configuration for comparing the voltage command signal with the reference voltage Vref. During a time period in which the pulse train voltage command signal Vc generated by the engine control ECU 4 exceeds the reference voltage Vref, the comparator 27 outputs a signal set at a low level.

The signal output by the comparator 27 as a signal indicating a result of a comparison is supplied to the base of a NPN type bipolar transistor 29 after being inverted by an inverter 28. Thus, the NPN type bipolar transistor 29 is put in an ON state during a time period in which the pulse train voltage command signal Vc generated by the engine control ECU 4 exceeds the reference voltage Vref.

The collector and emitter of the NPN type bipolar transistor 29 are respectively connected to the power supply terminal +Vcc through a resistor 30 and the ground through a resistor 31. Thus, the emitter of the NPN type bipolar transistor 29 outputs a pulse train voltage Va in accordance with the ON and OFF states of the NPN type bipolar transistor 29, that is, in accordance with the pulse train voltage command signal Vc generated by the engine control ECU 4. The pulse train voltage Va has a peak value determined by the voltage level of the power supply terminal +Vcc and the division ratio of the resistance of the resistor 30 to the resistance of the resistor 31.

The pulse train voltage Va output in this way is supplied to an integration circuit, which comprises a resistor 32 and a capacitor 33, to be converted into a direct current voltage signal Vb. The direct current voltage signal Vb is then supplied to the signal processing circuit 9. A series circuit of a resistor 34 and an NPN type bipolar transistor 35 is connected in parallel to the capacitor 33. Specifically, the collector and emitter of the NPN type bipolar transistor 35 are connected to the resistor 34 and the ground, respectively. The signals generated from the output terminals Q of the first latch circuit 21 and second latch circuit 25, which constitute the output stage of the over-current protection circuit 13, are supplied to the base of the NPN type bipolar transistor 35 by way of an OR gate 22b in the over-current protection circuit 13 as shown in FIG. 2. Each of the signals generated from the output terminals Q of the first latch circuit 21 and the second latch circuit 25 can be the abnormality detection signal set at a high level or a signal set at a low level.

Thus, when a signal set at a high level to serve as the abnormality detection signal is output from the over-current protection circuit 13, the MOSFET 5 is forcibly put in an OFF state and the NPN type bipolar transistor 35 is turned on by the abnormality detection signal. As a result, the direct current voltage signal Vb supplied to the signal processing circuit 9 is pulled down to the level of 0V electric potential of the ground. When the over-current protection circuit 13 ceases to output the abnormality detection signal, that is, when the over-current protection circuit 13 outputs a signal set at a low level, on the other hand, the NPN type bipolar transistor 35 is restored to the OFF state. Thus, after the driving circuit 12 forcibly turns off the MOSFET 5, the over-current protection circuit 13 ceases to output the abnormality detection signal and the driving circuit 12 again turns the MOSFET 5 on. As the MOSFET 5 is again turned on, the motor 1 is restarted, gradually raising the direct current voltage signal Vb supplied to the signal processing circuit 9 from 0 V.

Figure 4:
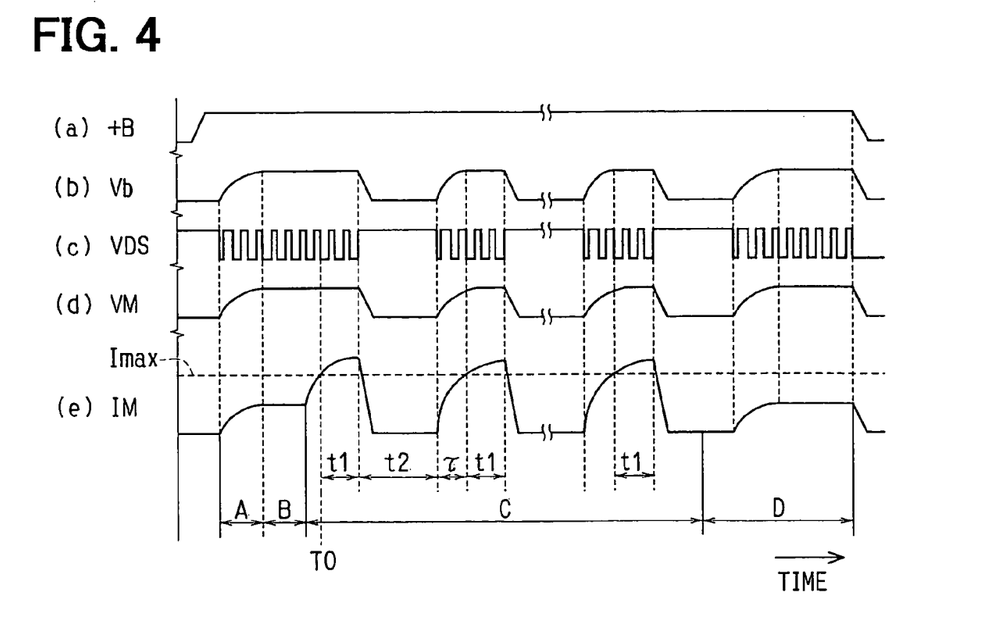
FIG. 4 is a timing chart of waveforms of signals appearing at various points in the first embodiment.

FIG. 4 is a diagram showing a model of typical waveforms of voltages and currents in the configuration shown in FIG. 1. To be more specific, (a) shows the wave form of a voltage +B output by the battery 3. (b) shows the waveform of the direct current voltage signal Vb supplied by the input signal conversion circuit 8 to the signal processing circuit 9. (c) shows the waveform of a drain voltage VDS of the MOSFET 5. (d) shows the waveform of the motor voltage VM, which is a voltage appearing between the terminals of the motor 1. (e) shows the waveform of a motor current IM, which is a load current flowing through the motor 1. It is to be noted that (c) merely shows a model of the waveform of a drain voltage VDS by ignoring the time base. In actuality, the waveform is a more complicated waveform reflecting a switching frequency of the MOSFET 5.

A time period A shown in FIG. 4 is a predetermined time interval following the start of the pulse train voltage command signal Vc output by the engine control ECU 4 with power supplied by the battery 3. During the time period A, the direct current voltage signal Vb rises gradually in the input signal conversion circuit 8 in accordance with a time constant, which is determined by the resistor 32 and the capacitor 33, being stabilized at a voltage level set by the pulse train voltage command signal Vc. The signal processing circuit 9 generates a PWM signal on the basis of the direct current voltage signal Vb and the reference clock signal received from the oscillation circuit 11. To be more specific, the generated PWM signal has a duty ratio gradually increased to follow a voltage command value indicated by the direct current voltage signal Vb.

The signal processing circuit 9 supplies the PWM signal to the driving circuit 12. The driving circuit 12 amplifies the PWM signal to generate an amplified signal used for switching the MOSFET 5. Switched by the amplified PWM signal, the MOSFET 5 exhibits a drain voltage VDS with the waveform thereof varying in accordance with a model shown in (c). With the MOSFET 5 switched in this way, the motor voltage VM rises gradually, being stabilized at a voltage level set by the pulse train voltage command signal Vc. In addition, the motor current IM also increases gradually before being stabilized.

A time period B shown in FIG. 4 is a time interval during which the motor voltage VM is stable at a voltage level set by the pulse train voltage command signal Vc output by the engine control ECU 4 and the motor current IM also stays at a stable value due to the stabilization of the motor voltage VM.

A time period C shown in FIG. 4 is a time interval beginning with a flow of an excessively large current due to an abnormality such as a rotation lock state of the motor or a short circuit state of the load in such a stable state and ending with disappearance of the excessively large current.

In the event of an abnormality such as a rotation lock state of the motor or a short circuit state of the load, the level of the motor current IM, that is, the level of the load current flowing through the MOSFET 5, increases. As the motor current IM exceeds an upper limit Imax shown in FIG. 4 at a time T0, the first comparator 15 outputs a signal set at the high level. The upper limit Imax is the first over-current level corresponding to the first threshold voltage Vth1.

The signal set at the high level is output to the trigger terminal T of the first ON-timer 19, triggering the first ON-timer 19 to start the first ON-timer operation cited above. As the first ON-timer operation is finished later at the end of the ON time period t1, the first ON-timer 19 outputs a signal for setting the first latch circuit 21 to latch a detected over-current state.

The first latch circuit 21 latching the detected over-current state outputs an abnormality detection signal to the driving circuit 12 by way of the OR gate 22a. Receiving the abnormality detection signal, the driving circuit 12 forcibly turns off the MOSFET 5. Thus, the motor current IM is cut off.

When the output of the abnormality detection signal causes the MOSFET 5 to be forcibly turned off, the abnormality detection signal also turns on the NPN type bipolar transistor 35 in the input signal conversion circuit 8, causing the direct current voltage signal Vb supplied by the input signal conversion circuit 8 to the signal processing circuit 9 to be pulled down to the level of the 0V electric potential of the ground.

Later on, when the abnormality detection signal disappears, the direct current voltage signal Vb rises again from the level of 0 V at a predetermined time constant to a value indicated by the voltage command signal Vc. The duty ratio of the PWM signal supplied by the signal processing circuit 9 to the driving circuit 12 also gradually increases to a value indicated by the direct current voltage signal Vb, that is, a value indicated by the voltage command signal Vc. As a result, the motor current IM also gradually rises from a cut-off state, in which the motor current IM was once put.

As described above, the first latch circuit 21 outputs the abnormality detection signal also to the trigger terminal T of the first OFF-timer 20, triggering the first OFF-timer 20 to start the first OFF-timer operation.

As the first OFF-timer operation is finished later at the end of the OFF time period t2, the first OFF-timer 20 outputs a signal for resetting the first latch circuit 21. When the first latch circuit 21 is reset, the detected over-current state latched therein is lifted. With this, the first latch circuit 21 ceases to output the abnormality detection signal to the driving circuit 12.

The ON time period t1 set as a time period in which the first ON-timer 19 is carrying out the first ON-timer operation also functions as a time period for monitoring the motor current IM. When the motor current IM did not exceed a second over-current level corresponding to the second threshold voltage Vth2 during this current monitoring time period, the second comparator 17 does not invert the output thereof to a signal set at a high level.

It is to be noted that second over-current level is higher than the first over-current level. Since the second comparator 17 does not invert the output thereof to a signal set at a high level, the second ON-timer 23 does not start the second timer operation and the second latch circuit 25 holds a lifted latch state (that is, a state in which the detected over-current state has been lifted from the second latch circuit 25) as it is.

Thus, when the motor current IM does not exceed the second over-current level, at the end of the OFF time period t2 following an operation to forcibly turn off the MOSFET 5, the signal output by the first OFF-timer 20 lifts the detected over-current state latched in the first latch circuit 21, causing the first latch circuit 21 to cease from outputting the abnormality detection signal. Thus, the driving circuit 12 resumes the operation to switch the MOSFET 5, that is, the PWM driving operation carried out on the motor 1. When the motor current IM again exceeds the first over-current level, the first comparator 15 outputs a signal set at a high level to the trigger terminal T of the first ON-timer 19, triggering the first ON-timer 19 to resume the first ON-timer operation.

Thus, when the motor current IM increases, exceeding the first over-current level but not the second over-current level, the first ON- and OFF-timer operations consecutively carried out by the first ON-timer 19 and the first OFF-timer 20 respectively are repeated after a pause (halt) period τ as shown in FIG. 4. The first ON- and OFF-timer operations carried out by stopping the abnormality detection signal for the ON time period t1 set in advance before producing the signal for the OFF time period t2 also set in advance. Since these operations are repeated after the pause period τ, the abnormality detection signal is stopped for a total time of the ON time period t1 and the pause period τ. In this way, the first ON- and OFF-timer operations of the first embodiment are carried out repeatedly. It is to be noted that the pause period τ is a time period during which the motor current IM rises from the zero level to the first over-current level.

Thus, when the motor current IM increases, exceeding the first over-current level but not the second over-current level, the MOSFET 5 is forcibly turned off for the OFF time period t2 immediately following the initial current monitoring period t1, in which the MOSFET 5 was in the ON state, and is turned on again for a total period of the ON time period t1 and the pause period τ. These operations are carried out repeatedly.

When the motor current IM further increases, exceeding the second over-current level corresponding to the second threshold voltage Vth2 during a current monitoring period, on the other hand, the second comparator 17 outputs a signal set at the high level to the trigger terminal T of the second ON-timer 23, triggering the second ON-timer 23 to start the second timer operation. As the second timer operation is finished later at the end of the ON time period t1', the second ON-timer 23 outputs a signal for setting the second latch circuit 25 to latch the detected over-current state in the second latch circuit 25.

The second latch circuit 25 latching the detected over-current state outputs an abnormality detection signal to the driving circuit 12 by way of the OR gate 22a. Receiving the abnormality detection signal, the driving circuit 12 forcibly turns off the MOSFET 5. Thus, the motor current IM is cut off. It is to be noted that the high level signal output by the second comparator 17 is supplied to the disable terminals N of the first ON-timer 19 and the first OFF-timer 20. Thus, the first ON- and OFF-timer operations of the first ON-timer 19 and the first OFF-timer 20 respectively are inhibited.

As described above, the second latch circuit 25 outputs the abnormality detection signal also to the trigger terminal T of the second OFF-timer 24, triggering the second OFF-timer 24 to start the second OFF-timer operation. As the second OFF-timer operation is finished later at the end of the OFF time period t2', the second OFF-timer 24 outputs a signal for resetting the second latch circuit 25. When the second latch circuit 25 is reset, the detected over-current state latched therein is lifted. With this, the second latch circuit 25 ceases to output the abnormality detection signal to the driving circuit 12.

The second ON- and OFF-timer operations carried out by stopping the abnormality detection signal for the ON time period t1' set in advance before producing to output the signal for the OFF time period t2' also set in advance. Since these operations are repeated after the pause period τ, the abnormality detection signal is stopped for a total time of the ON time period t1' and the pause period τ. In this way, the second ON- and OFF-timer operations of the first embodiment are carried out repeatedly.

Thus, when the motor current IM exceeds the second over-current level corresponding to the second threshold voltage Vth2, the driving circuit 12 receiving the abnormality detection signal from the second latch circuit 25 keeps the MOSFET 5 in the OFF state till the end of the OFF time period t2' set in the second OFF-timer 24. Since the OFF time period t2' is longer than the OFF time period t2 set in the first OFF-timer 20, the OFF time period of the MOSFET 5 is lengthened when the motor current IM exceeds the second over-current level. That is, control is executed to lengthen the OFF time period set by a timer function to such a relatively long one in comparison with the ON time period set by the timer function that, the larger the current flowing through the motor, the bigger the difference between the OFF time period and the ON time period.

As described above, with the motor current IM exceeding the second over-current level, after being forcibly put in an OFF state during the OFF time period t2' (>t2), the MOSFET 5 is again put in the ON state for a total time of the ON time period t1' (<t1) and the pause period τ, and these operations are carried out repeatedly.

A time period D shown in FIG. 4 is a time period in which a rotation lock state of the motor 1, a short circuit state of the load or another factor causing the excessively large current to flow through the motor 1 is removed so that the motor current IM can be reduced to a magnitude lower than the first over-current level corresponding to the first threshold voltage Vth1.

Figure 5A:
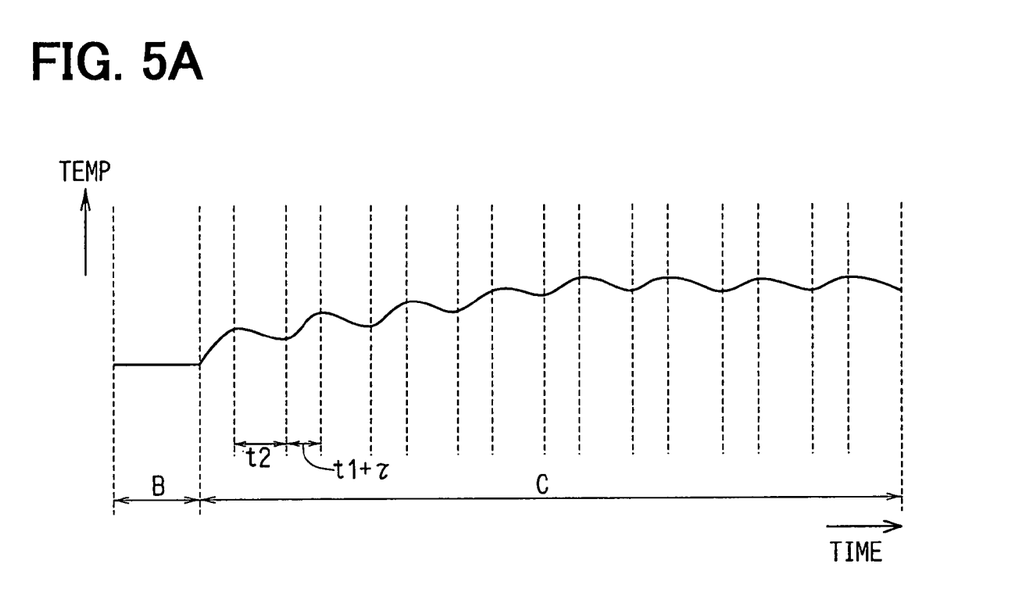
FIGS. 5A and 5B are timing charts showing temperature changes in the first embodiment.
Figure 5B:
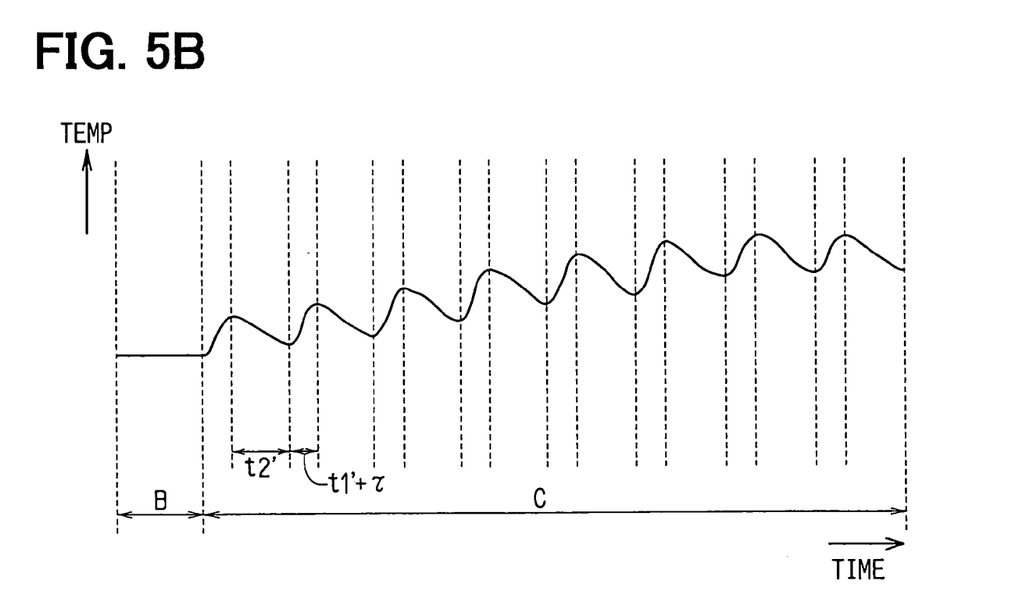

FIGS. 5A and 5B are diagrams each showing typical temperature variations of the MOSFET 5 during the time period C shown in FIG. 4. The time period B shown in FIGS. 5A and 5B is the same as the time period B shown in FIG. 4. That is, during this time period, the motor voltage VM and the motor current IM each have a stable value. During this time period, the temperature variations of the MOSFET 5 are stabilized at a predetermined level.

FIG. 5A shows a time period C in which the motor current IM increases, exceeding the first over-current level but not the second over-current level. In this time period, an operation is carried out repeatedly to stop the MOSFET 5 for the OFF time period t2 set in the first OFF-timer 20 before driving again for a total time of the ON time period t1 set in the first ON-timer 19 and the pause period τ. Thus, the temperature of the MOSFET 5 increases during the time period (t1+τ) but decreases during the OFF time period t2, eventually getting saturated at a level capable of maintaining the performance of the MOSFET 5.

On the other hand, FIG. 5B shows the time period C in which the motor current IM increases, exceeding even the second over-current level. In this time period, an operation is carried out repeatedly to stop the MOSFET 5 for the OFF time period t2' (>t2) set in the second OFF-timer 24 before driving again for a total time of the ON time period t1' (<t1) set in the second ON-timer 23 and the pause period τ. During the time period C, in which the motor current IM exceeds the second over-current level as described above, the temperature increases at a gradient larger than the rising gradient shown in FIG. 5A while the MOSFET 5 is being driven. However, the time period (t1'+τ) during which the MOSFET 5 is driven is shorter than the corresponding time period (t1+τ) shown in FIG. 5A. On the other hand, the OFF time period t2' during which the MOSFET 5 is stopped is longer than the corresponding time period t2 shown in FIG. 5A. As a result, the temperature of the MOSFET 5 eventually gets saturated at a level capable of maintaining the performance of the MOSFET 5.

The over-current protection circuit 13 having a configuration according to the embodiment carries out an over-current protection operation while turning the MOSFET 5 on and off continuously. During a time period in which this over-current protection operation is carried out, control is executed in the configuration to lengthen the OFF time period of the MOSFET 5 to a value relatively longer in comparison with the ON time period of the MOSFET 5 by such a difference that, the larger the motor current IM, the larger the difference between the OFF time period and the ON time period. Thus, in the over-current protection operation, the ratio of the OFF period time to the ON period time increases as the motor current IM rises. Therefore, by the over-current protection operation, the value at which the increase of the temperature of the MOSFET 5 gets saturated can be suppressed to a relatively low level even when the motor current IM increases.

As a result, when the function to protect the motor 1 and the motor control apparatus 2 from damage caused by heat generated by an excessively large current is executed, the saturation temperature described above can be suppressed to a level, at which the performance of the MOSFET 5 can be maintained, without regard to the magnitude of the motor current IM. Accordingly, the reliability of the over-current protection operation can be improved.

In addition, in this over-current protection operation, the operating state of the motor 1 can be maintained although intermittently. Thus, the present invention is suitable for an application in which the over-current protection operation is carried out as is the case of this embodiment. An example of such an application is an electrically-driven fan system used in cooling equipment for the engine of an automobile.

In addition, when the over-current protection circuit 13 outputs an abnormality detection signal to forcibly turn off the MOSFET 5, the abnormality detection signal also turns on the NPN type bipolar transistor 35 in the input signal conversion circuit 8. This causes the direct current voltage signal Vb supplied by the input signal conversion circuit 8 to the signal processing circuit 9 to be pulled down to the level of the 0V electric potential of the ground. Thus, when the over-current protection circuit 13 ceases to output the abnormality detection signal, the level of the direct current voltage signal Vb gradually increases from the level of 0 V.

Accordingly, the pulse width of the PWM signal supplied by the signal processing circuit 9 to the driving circuit 12 also gradually increases to a value corresponding to the voltage command signal Vc. As a result, an advantageous effect can be provided as an effect of suppressing a rush current flowing through the motor 1 at an activation time of the motor 1 to a low level.

Modification of First Embodiments

The first embodiment can be modified as follows.

While the first embodiment has only 2 stages of combinations of an ON-timer and an OFF-timer, that is, the combination of the first ON-timer 19 and the first OFF-timer 20 as well as the combination of the second ON-timer 23 and the second OFF-timer 24, the number of such combination stages can also be increased to 3 or even a larger value. In a configuration including a larger number of such stages, the over-current protection operation can be carried out with higher accuracy in dependence on the magnitude of the motor current IM.

In addition, the timer operating ON time period t1 set in the first ON-timer 19 is set at a value greater than the timer operating ON time period t1' set in the second ON-timer 23 to satisfy a relation of t1>t1'. On the other hand, the timer operating OFF time period t2 set in the first OFF-timer 20 is set at a value greater than the timer operating OFF time period t2' set in the second OFF-timer 24 to satisfy a relation of t2<t2'. However, the timer operating ON time periods t1 and t1', and the timer operating OFF time periods t2 and t2' do not have to satisfy these relations, but can instead be set at any values as long as the ratio of the timer operating time period t2' to the timer operating time period t1' in the combination of the second OFF-timer 24 and the second ON-timer 23 is greater than the ratio of the timer operating time period t2 to the timer operating time period t1 in the combination of the first OFF-timer 20 and the first ON-timer 19.

Furthermore, while the first embodiment has the first latch circuit 21 and the second latch circuit 25 as separate components, the configuration can also be modified into a configuration in which the functions of the first latch circuit 21 and the second latch circuit 25 are carried out by a single latch circuit.

Second Embodiment

Figure 6:
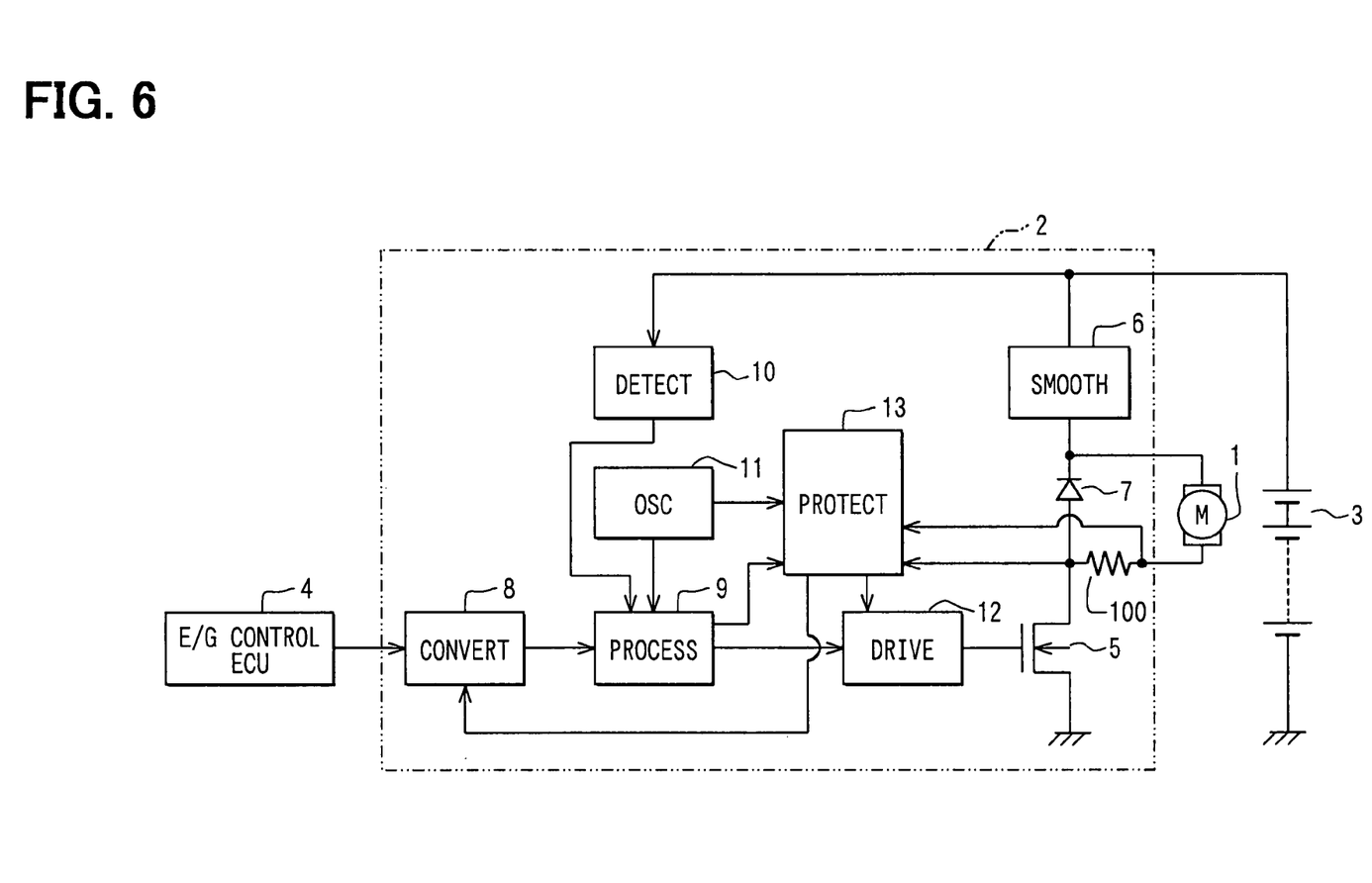
FIG. 6 is a block diagram showing a motor control apparatus according to the second embodiment of the present invention.

The second embodiment shown in FIG. 6 is basically the same as the first embodiment shown in FIG. 1. In the second embodiment, however, a resistor 100 is connected between the negative side terminal of the motor 1 and a junction point between the MOSFET 5 and the flywheel diode 7. In addition, a voltage appearing between the ends of the resistor 100 is supplied to the over-current protection circuit 13.

Figure 7:
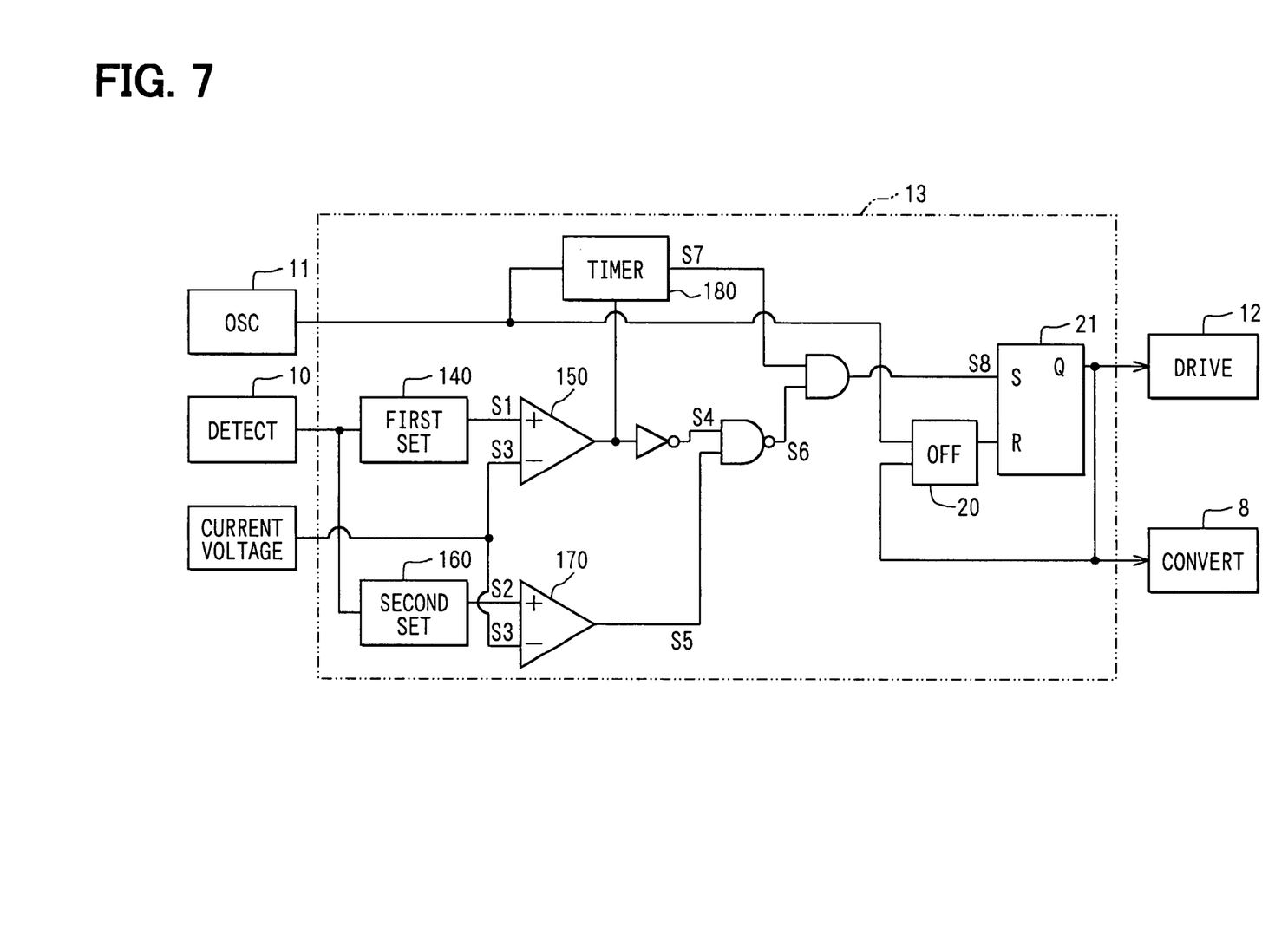
FIG. 7 is a detailed circuit configuration of an over-current protection circuit in the second embodiment.
Figure 8:
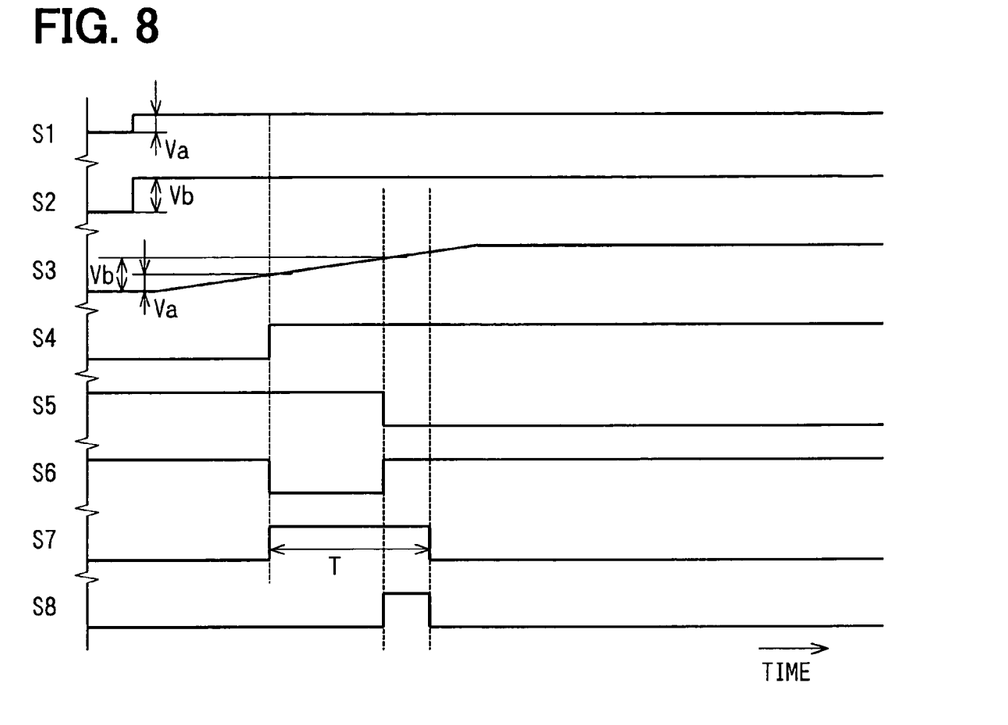
FIG. 8 is a timing chart of waveforms of signals appearing at various points in the second embodiment.

In the over-current protection circuit 13 shown in FIG. 7, the motor current IM is detected as a current voltage (S3 in FIG. 8) appearing between the ends of the resistor 100. The over-current protection circuit 13 includes a low side over-current detection threshold voltage setting circuit 140 for setting a low side over-current detection threshold voltage Va (S1 in FIG. 8) corresponding to a low side threshold current. A low side determination comparator 150 compares the low side over-current detection threshold voltage Va output by the low side over-current detection threshold voltage setting circuit 140 with the detected voltage representing the motor current IM to determine whether or not an excessively large current greater than the low side threshold current is flowing.

When an excessively large current greater than the low side threshold current is flowing, the low side determination comparator 150 supplies a signal to a detection timer 180, triggering the detection timer 180 to start an ON-timer operation for an ON time period T preset in the detection timer 180. At the end of the ON time period, the detection timer 180 outputs a signal (S7 in FIG. 8).

The over-current protection circuit 13 also includes a high side over-current detection threshold voltage setting circuit 160 for setting a high side over-current detection threshold voltage Vb (S2 in FIG. 8) corresponding to a high side threshold current. A high side determination comparator 170 compares the high side over-current detection threshold voltage Vb output by the high side over-current detection threshold voltage setting circuit 160 with the detected voltage S3 representing the motor current IM to determine whether or not an excessively large current greater than the high side threshold current is flowing.

When an excessively large current greater than the high side threshold current is detected (S5 in FIG. 8), the detection of the excessively large current is latched in a latch circuit 21 as a logic of signals (S4, S5, S6 and S7 in FIG. 8) generated by the low side determination comparator 150, the high side determination comparator 170 and the detection timer 180. When the detection of this excessively large current is latched in the latch circuit 21, the latch circuit 21 supplies an abnormality detection signal to the driving circuit 12, driving the driving circuit 12 to forcibly turn off the MOSFET 5.

The abnormality detection signal is also supplied to an OFF-timer 20, triggering the OFF-timer 20 to start an OFF-timer operation for an OFF time period preset in the OFF-timer 20. In addition, the abnormality detection signal is also supplied to the input signal conversion circuit 8. At the end of the OFF time period, the detected over-current state latched in the latch circuit 21 is lifted, the MOSFET 5 is turned on again and a signal indicating that the detected over-current state has been lifted is supplied to the input signal conversion circuit 8.

According to the above operation, the over-current protection circuit 13 restricts the driving circuit 5 from driving the MOSFET 5, only after the current in the motor 1 exceeds the high side threshold value Vb within the time period T of the timer 180.

The over-current protection circuit 13 shown in FIG. 7 can be implemented into a plurality of configurations each used for executing a desired method of detecting an excessively large current. Thus, an over-current detection method adapted to the condition of a current flowing at a start time can be realized.

Figure 9:
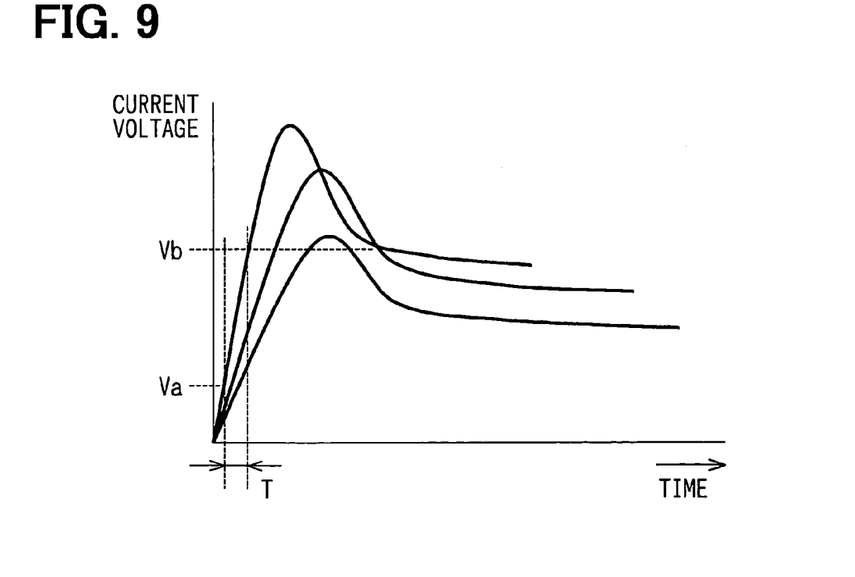
FIG. 9 is a timing chart showing a current change in the second embodiment.

FIG. 9 is a diagram showing curves representing different waveforms of currents flowing in a rotation lock state of the motor 1 and a short circuit state of the load.

The present invention should not be limited to the above embodiments and modifications, but may be implemented in many other ways without departing from the spirit of the invention.

What is claimed is:

1. A motor control apparatus, comprising:
a semiconductor switching device provided in a current conduction path of a motor;
a driving circuit for carrying out an operation to generate a control signal for turning the semiconductor switching device on and off; and
an over-current protection circuit for outputting an abnormality detection signal for stopping the operation carried out by the driving circuit when a current flowing through the motor exceeds a predetermined threshold value, wherein the over-current protection circuit is for repeatedly carrying out a timer operation to stop the abnormality detection signal for an ON time period set in advance before producing the abnormality detection signal for an OFF time period also set in advance when the current flowing through the motor exceeds a predetermined threshold value, and for controlling to lengthen the OFF time period to a relatively larger value in comparison with the ON time period by such a difference that, the larger the current flowing through the motor, the larger the difference during the operation period of the timer operation, and wherein the over-current protection circuit includes:
a latch circuit for outputting the abnormality detection signal in a set state;
a first ON-timer and a first OFF-timer for alternately carrying out first ON- and OFF-timer operations respectively when the current flowing through the motor exceeds a first predetermined threshold value; and
a second ON-timer and a second OFF-timer for alternately carrying out second ON- and OFF-timer operations respectively when the current flowing through the motor exceeds a second predetermined threshold value greater than the first predetermined threshold value, wherein
the first ON-timer has a configuration for setting the latch circuit at the end of the first ON-timer operation and for ceasing the first ON-timer operation when the current flowing through the motor exceeds the second predetermined threshold;
the first OFF-timer has a configuration for resetting the latch circuit at the end of the first OFF-timer operation and for ceasing the first OFF-timer operation when the current flowing through the motor exceeds the second predetermined threshold;
the second ON-timer has a configuration for setting the latch circuit at the end of the second ON-timer operation;
the second OFF-timer has a configuration for resetting the latch circuit at the end of the second OFF-timer operation; and
a ratio of the duration of the second OFF-timer operation to the duration of the second ON-timer operation is greater than a ratio of the duration of the first OFF-timer operation to the duration of the first ON-timer operation.

2. A motor control apparatus according to claim 1, further comprising: a signal processing circuit for outputting a pulse width modulation signal having a duty ratio depending on an input voltage to the driving circuit; and an input signal conversion circuit for supplying a direct current voltage signal produced as a result of integration of a pulse train output level command signal received from an external source to the signal processing circuit, wherein to input signal conversion circuit has a configuration including a discharge circuit for pulling down the direct current voltage signal to a zero level when the over-current protection circuit outputs the abnormality detection signal.

* * * * *